S. S. HOGLE.

Revolving Harrow.

No. 804. Reissued Aug. 30. 1859.

Witnesses:

R. E. Rockwell
Chas. W. Everitt

Inventor:

Sidney S. Hogle

AM. PHOTO-LITHO. CO. N.Y. (OSBORNE'S PROCESS.)

UNITED STATES PATENT OFFICE.

SIDNEY S. HOGLE, OF CLEVELAND, OHIO.

IMPROVEMENT IN HARROWS.

Specification forming part of Letters Patent No. 16,866, dated March 17, 1857; Reissue No. 804, dated August 30, 1859.

*To all whom it may concern:*

Be it known that I, SIDNEY S. HOGLE, of Cleveland, in the county of Cuyahoga and State of Ohio, have invented a new and useful Improvement in Rotating Harrows; and I do hereby declare that the following is a full and exact description thereof, reference being had to the accompanying drawings, which form a portion of this specification.

Figure 1:
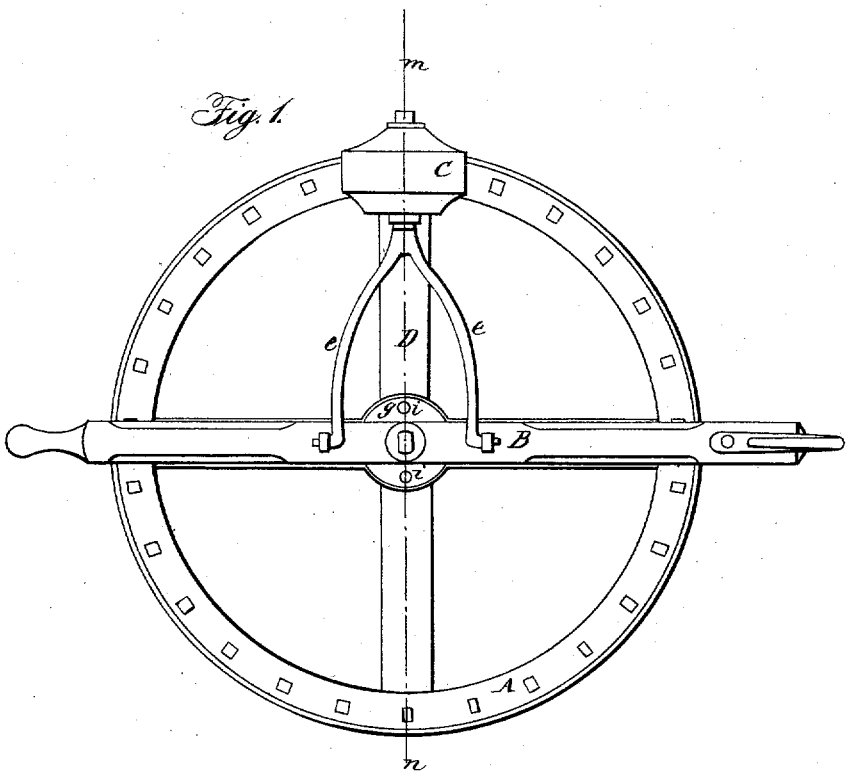
Figure 2:
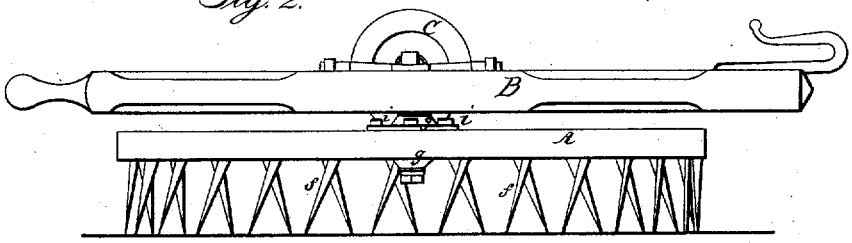
Figure 3:
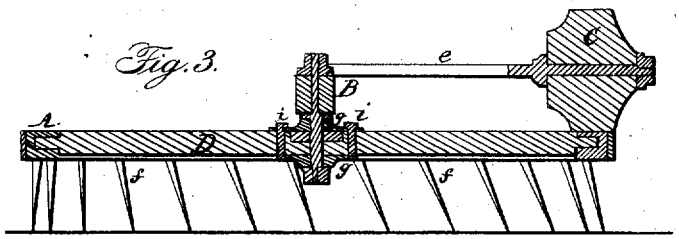

Figure 1 is a top view of a rotating harrow which embodies the above-mentioned improvement; Fig. 2, a side elevation of the same, and Fig. 3 a section in the line *m n* of Fig. 1.

Similar letters indicate corresponding parts in each of the drawings.

I believe myself to be the original and first inventor of the vitally-important principle which is embodied in the within-described harrow—viz., causing the points of the rotating harrow-teeth to descend deeper into the ground on one side of the line of draft of said harrow than they do upon the opposite side of the same, which arrangement causes the dragging force which is applied to said harrow to impart a positive and regular rotary motion thereto without the assistance of any auxiliary gearing-wheels. The cause of the aforesaid rotation is self-evident. The teeth of the harrow which descend to the greatest depth into the earth have a constant tendency to drag behind, while the teeth on the opposite side of the harrow, which require a less amount of power to draw them through the surface of the earth, have a corresponding tendency to advance until they pass the line of draft, and are again dragged rearwardly in consequence of their again descending to a greater depth into the earth.

Should all the teeth of a rotating harrow be allowed to descend an equal distance into the earth, no amount or description of mere dragging force would cause such a harrow to rotate upon its axis with positiveness or regularity. Such a harrow would sometimes partially revolve in one direction and sometimes in another during its passage over inequalities of surface.

The positive rotation of a harrow upon its axis as it is drawn forward over the surface of the earth greatly increases the disintegrating effect of the teeth thereof upon the soil, as must be readily apparent to all persons who are at all familiar with agricultural operations; and it is also equally apparent that no additional power will be required to draw forward the said harrow when it is caused to rotate in the above-described manner; but, on the contrary, the rotation of the harrow will cause it to move forward with more steadiness, and consequently a less expenditure of power will be required to produce the aforesaid compound movement of my improved harrow than would be required to simply drag forward the said harrow should it be permitted to rest equally upon the points of its entire series of teeth.

When my improved harrow has but one tooth-armed wheel or frame pivoted to its draft-bar one side of the said tooth-armed wheel or frame may be depressed to the desired extent by a great variety of means. I have generally employed for this purpose a weighted roller, C, which I have combined with the draft-bar through the medium of an arm, *e*, which I have hinged to the draft-bar in such a manner as to allow the said roller to rest either upon the rim of the harrow or upon a ring secured to the spokes or arms of said harrow. The said arm *e*, I generally hinge to the draft-bar of the harrow in such a manner that its position can be reversed for the purpose of enabling the roller C to rest upon either side of the harrow, and to be readily shifted from one side of the harrow to the other whenever it may be desired to produce a reverse movement of the same; but it is not necessary that the weight employed for depressing one side of a rotating horizontal harrow should be in the form of a roller.

The teeth in my improved harrow may descend vertically or at any inclination that may be preferred. Any form of cultivator-teeth may also be employed in my improved harrows.

The unequal descent of the points of the teeth of my improved harrow below the surface of the earth is not shown in the accompanying drawings, for the reason that these drawings represent the harrow as resting upon a floor or platform.

What I claim as my invention, and desire to secure by Letters Patent, is—

Causing the points of the teeth of a rotating harrow to descend deeper into the ground on one side of their axis of rotation than they do upon the opposite side of the same, for the purpose of enabling the dragging force which may be exerted upon said harrow to impart a positive rotary motion thereto without the aid of gearing-wheels.

SIDNEY S. HOGLE.

Witnesses:
R. E. ROCKWELL,
CHAS. D. EVERETT.